United States Patent [19]

Tanis

[11] Patent Number: 5,076,418
[45] Date of Patent: Dec. 31, 1991

[54] FEEDER ASSEMBLY FOR A COMBINE

[75] Inventor: Dale R. Tanis, Naperville, Ill.

[73] Assignee: J. I. Case Company, Racine, Wis.

[21] Appl. No.: 609,873

[22] Filed: Nov. 6, 1990

[51] Int. Cl.⁵ ............................................. B65G 65/16
[52] U.S. Cl. .................................. 198/518; 198/719;
198/727; 198/731; 198/734; 198/735.1
[58] Field of Search ............. 198/719, 727, 728, 730,
198/731, 734, 735.1, 518, 513, 520, 716;
460/114

[56] References Cited

U.S. PATENT DOCUMENTS

| 1,535,386 | 4/1925 | Walker et al. | 198/719 |
| 3,135,651 | 6/1964 | Starret | 198/716 X |
| 3,927,759 | 12/1975 | Hyler et al. | 198/719 |
| 4,736,833 | 4/1988 | Tanis | 198/732 X |
| 4,787,400 | 11/1988 | Tanis | 198/731 X |
| 4,890,723 | 1/1990 | Debuisson et al. | 198/728 X |
| 4,908,002 | 3/1990 | Tanis | 198/731 X |

FOREIGN PATENT DOCUMENTS

| 2727038 | 1/1978 | Fed. Rep. of Germany | 198/716 |
| 549295 | 11/1942 | United Kingdom | 198/716 |
| 891325 | 3/1962 | United Kingdom | 198/734 |

Primary Examiner—Robert P. Olszewski
Assistant Examiner—Cheryl L. Gastineau
Attorney, Agent, or Firm—Dressler, Goldsmith, Shore, Sutker & Milnamow, Ltd.

[57] ABSTRACT

An improved combine feeder assembly including a conveyor and a feeder housing which envelopes the conveyor. The conveyor is comprised of a plurality of endless driving chains and a plurality of feeder slats driven by the chains. Each feeder slat is secured at opposite ends to the chains by connectors allowing for endwise movement of the feeder slats in response to impact loading thereagainst. Moreover, each feeder slat has an outer profile providing an extended reach at the center of the slat as compared to the reach provided toward opposite ends. The feeder housing preferably includes a bottom wall configured to compliment the outer profile of the feeder slats and enhance combine operation.

16 Claims, 4 Drawing Sheets

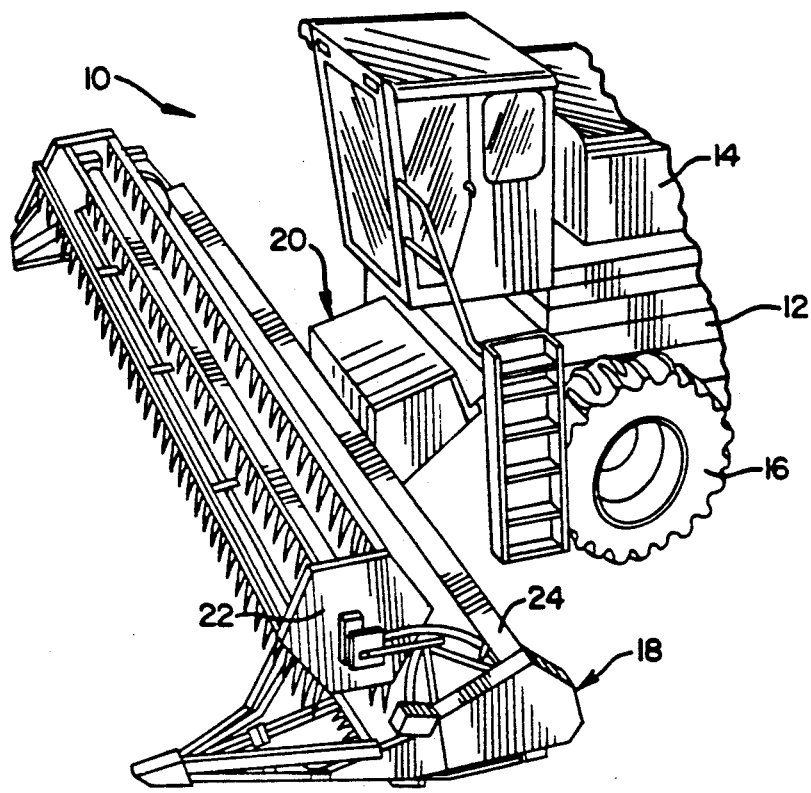
FIG_1
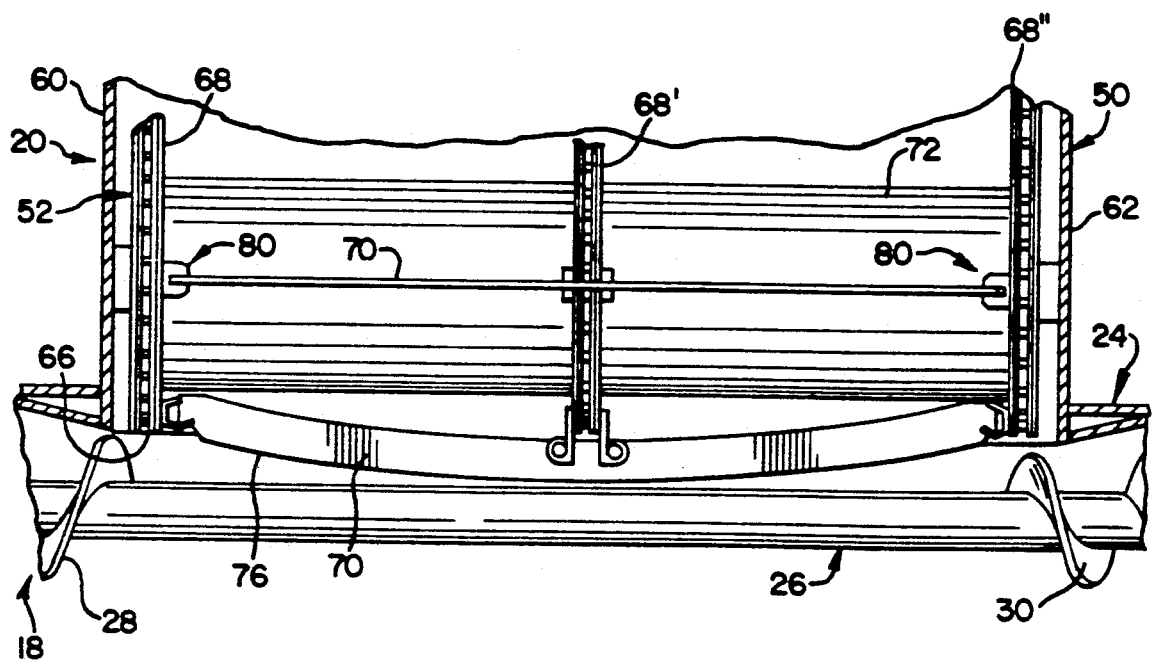
FIG_2

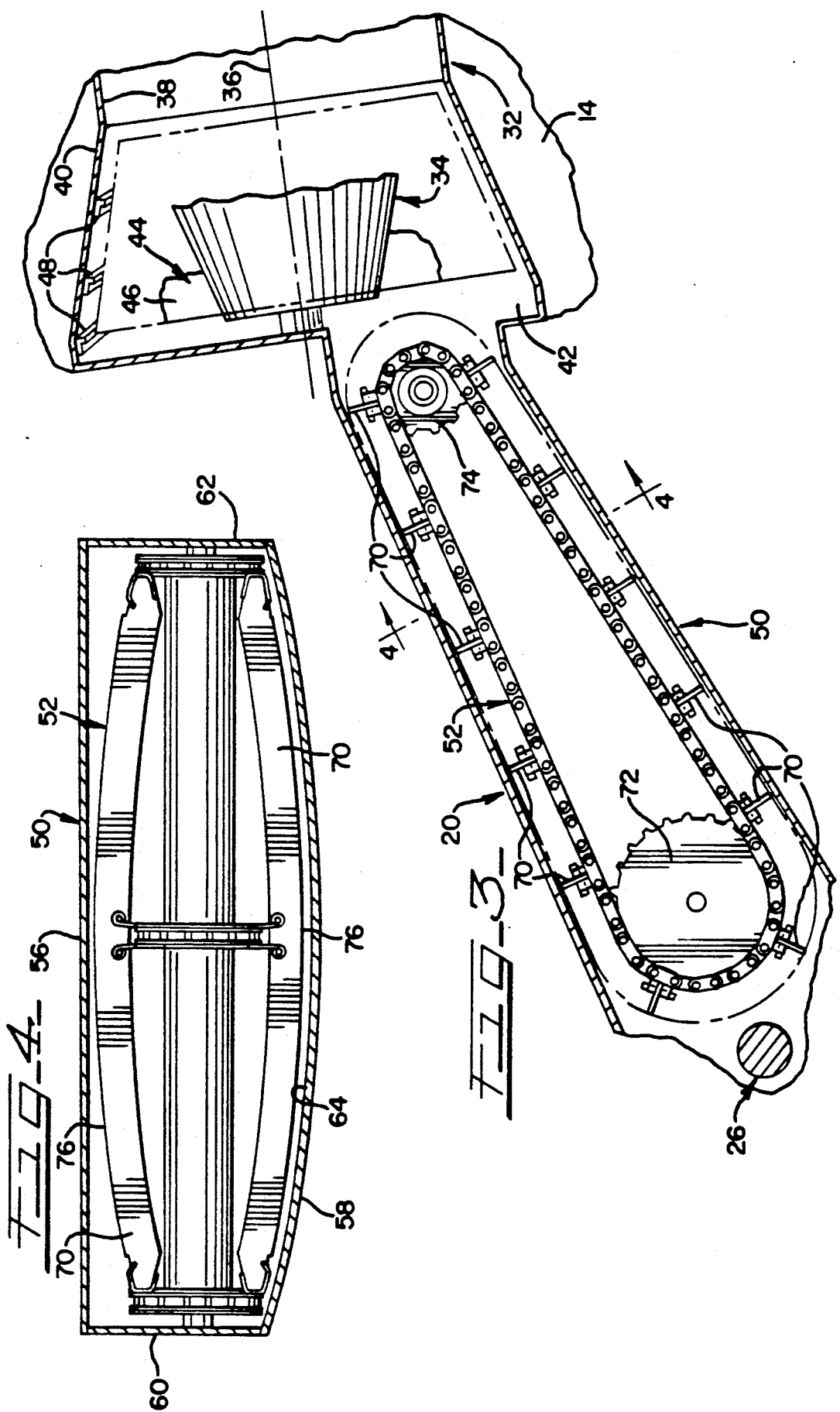

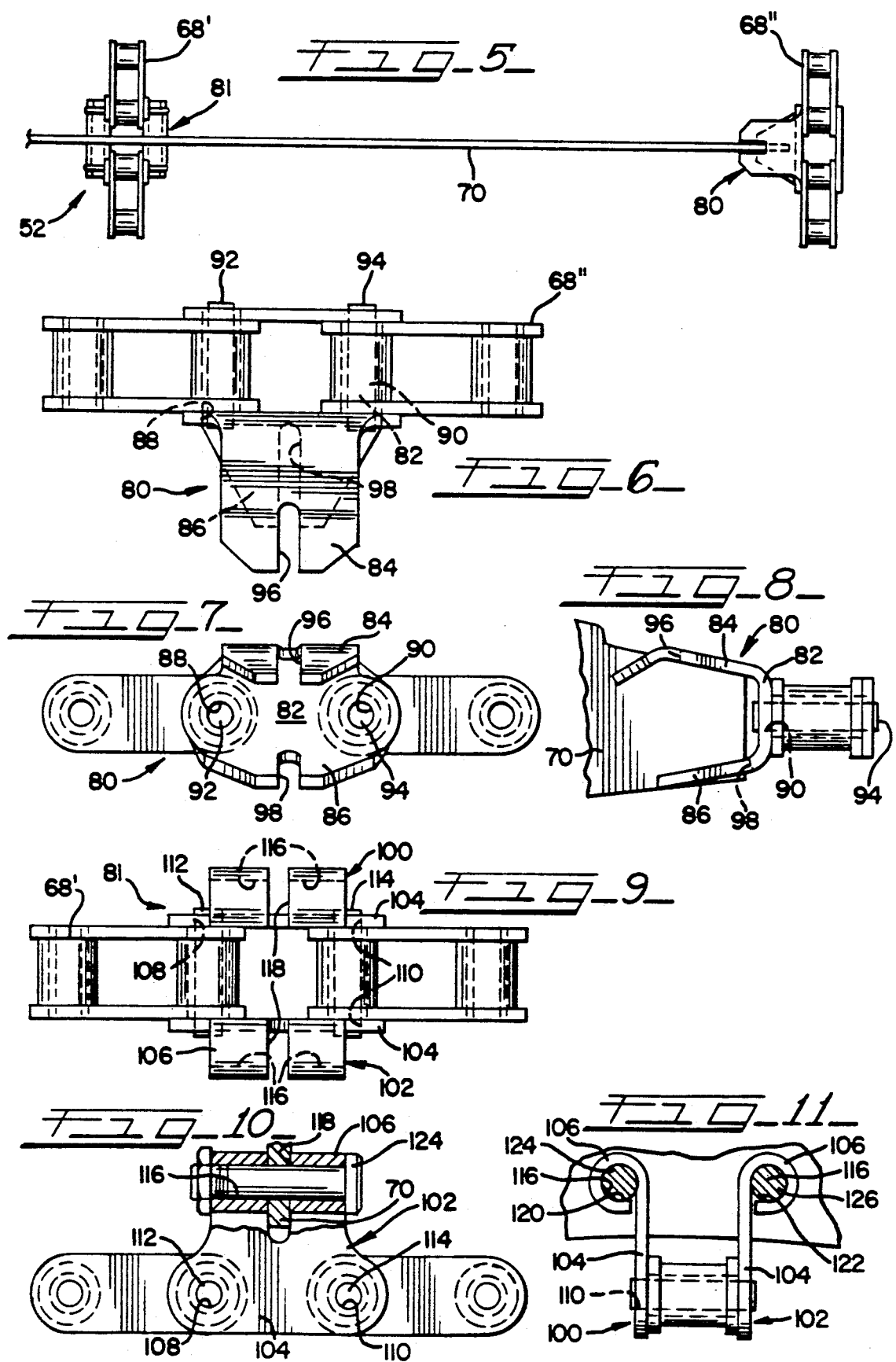

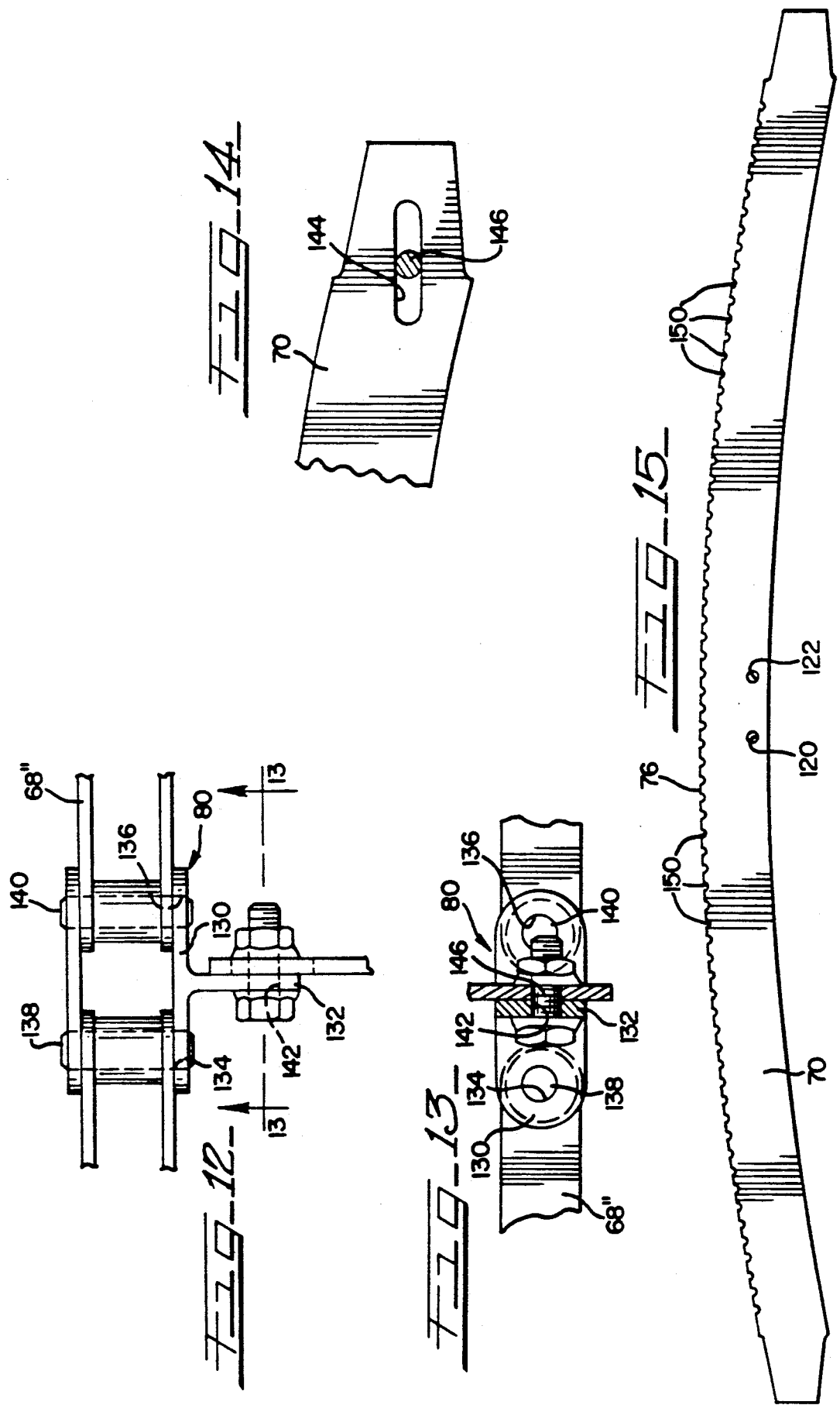

FEEDER ASSEMBLY FOR A COMBINE

FIELD OF THE INVENTION

This invention generally relates to combines and, more particularly, to a feeder assembly for feeding crop material to a threshing apparatus of the combine.

BACKGROUND OF THE INVENTION

Combines for harvesting various crop materials are well known in the art. A typical combine includes a header assembly for harvesting crop material, a feeder assembly for receiving and rearwardly moving the harvested crop material, and a threshing apparatus for receiving the crop material from the feeder assembly and for separating material such as grain from material other than grain.

The header assembly is connected to and extends across a forward end of a fore-and-aft extending frame of the combine A conventional header assembly includes a reciprocating knife assembly for cutting the crop material, a harvesting apparatus or reel, and a laterally elongated consolidating auger for moving the crop material received from the harvesting apparatus toward a central location.

The feeder assembly receives the crop material advanced or moved toward the central location and feeds it upwardly and rearwardly toward the threshing apparatus. A conventional feeder assembly includes a conveyor comprised of a plurality of laterally spaced fore-and-aft extending endless driving chains and a series of laterally extending feeder slats. The chains of the conveyor are entrained about driving sprockets or drums. The feeder slats are typically secured to the driving chains as with pin connectors at opposite ends of the slats. The feeder assembly further includes a feeder housing which rotatably mounts the drums and substantially envelopes the conveyor. An outer surface on each slat extends above a bottom wall on the housing and coacts therewith in rearwardly advancing crop material toward the threshing apparatus.

The threshing apparatus receives the crop material from the feeder assembly. Different combine manufacturers provide different threshing apparatus designs. An axial-flow threshing apparatus, however, provides a beneficial threshing action by threshing the grain several times repeatedly, but gently, as it spirals around a large diameter rotor assembly.

At its forward crop receiving end, an axial-flow type threshing apparatus typically includes a transition housing with an impeller rotatably mounted therewithin. The feeder system introduces the crop material to the impeller in an undershot manner. Thereafter, the impeller forcibly moves the crop material radially outward and rearward toward the rotor assembly.

As is apparent, the feeder assembly is an important mechanism of the combine and can greatly affect combine efficiency. At its forward end, the conveyor acts to strip the crop material from the auger of the head assembly. To affect an aggressive feeding action, the forward drum of the conveyor is adjusted such that an outer surface or profile of the feeder slats "reaches" in close proximity to the auger of the header assembly.

Although enhancing feeding action, an extended reach offered by the outer profile of the slats decreases swing clearance on opposite sides of the conveyor. At a forward end of the feeder assembly, the slats swing about the periphery of the front drum in close proximity to flights on the auger of the head assembly. Adjusting the front drum to extend the reach of the slats into proximity with the auger of the header assembly likewise extends the driving chains into the crop material flow path, thus hindering the flow of material into the conveyor.

The rear drum of the feeder assembly is likewise adjustable in a fore-and-aft direction. To reduce backfeed to the conveyor, the reach of the feeder slats at the rear end of the conveyor is extended proximate to a front face of the impeller of the rotor assembly.

There is a direct relation between the reach of the feeder slats at the rear end of the conveyor and the introduction of crop material to the impeller of the rotor assembly. Adjusting the feeder slats to reach closely adjacent the front face of the impeller of the rotor assembly normally raises the feed zone wherein crop material is introduced to the rotor assembly.

At opposite sides of the conveyor, crop material is advantageously introduced to the periphery of the impeller. Raising the introductory feed zone or region has minimal effect on crop material introduced toward the impeller periphery. At the center of the conveyor, however, whereat the majority of crop material is concentrated, raising the feed zone causes the crop material to be introduced to the impeller closer to the axis of rotation of the rotor assembly Accordingly, the advantage of introducing crop material toward the high speed impeller periphery is lost. As will be appreciated, introducing crop material closer to the axis of rotor assembly rotation often results in backfeed problems on the feeder system.

In addition to the above, known feeder assemblies are often prone to malfunctions caused by part breakage and deformation. The parts which break or deform most often include the elongated feeder slats and the connectors used to attach the feeder slats to the driving chains.

Breakage of the connectors and deformation of the slats can result from a variety of conditions. As an example, overloading of crops on the conveyor, particularly when accompanied by an excessive wedging or buildup of crop material between the slats and the conveyor housing, will tend to break or deform such parts. Moreover, encountering obstacles such as rocks and stones while the conveyor is moving will cause impact loading and result in deflection of the slats. These and other conditions are not at all uncommon in combine operations.

As will be appreciated, when an obstacle impacts with a feeder slat, the slat deflects and its ends tend to laterally pull away from the connector securing the slat to the respective driving chain. Such impacts can cause permanent deformation of the slats and/or immediate breakage of the connectors which secure the slats to the chains. Time consuming repairs and/or replacement of such slats and connectors adversely affects combine operation often when harvesting time is at a premium. Not repairing such parts often results in vibrations to the combine and may increase the extent of damage to the combine.

Thus, there is a desire and need for a feeder assembly which promotes advancement of crop material between the header assembly and threshing apparatus and which is designed to tolerate the extreme forces and impact loading normally occurring during combine operation.

SUMMARY OF THE INVENTION

In view of the above, and in accordance with the present invention, there is provided an improved feeder assembly for feeding crop material between a header assembly and a threshing apparatus of a combine. The feeder assembly includes a conveyor comprised of a plurality of endless driving chains and a series of feeder slats driven by the chains. Each feeder slat is secured at opposite ends to the driving chains by connectors allowing for endwise movement of the feeder slats in response to impact loading thereagainst. Moreover, each feeder slat has an outer profile providing an extended reach at the center of the slat as compared to the reach provided toward opposite ends of each feeder slat. A feeder housing envelopes the conveyor and preferably includes a bottom wall configured to complement the outer profile on the feeder slats.

In a preferred form, each feeder slat has an outer profile with a slanted generally convex configuration. In the illustrated embodiment, each feeder slat bridges the lateral space between the driving chains and is fabricated from a resiliently deformable material. In a most preferred form, the slats are centrally connected by a support assembly extending from a third endless chain interposed between the driving chains. To promote crop material advancement, serrations may be defined along the outer profile of a plurality of the slats.

The profile on the bottom wall of the feeder housing promotes crop material delivery by modifying the feed zone into the impeller. A concave profile on the feeder housing promotes delivery of crop material toward the peripheral edge of the impeller blades thereby facilitating movement of the crop material circumferentially outward and rearwardly toward the rotor assembly for subsequent threshing.

To allow the feeder slats to better withstand the impact loading applied thereto during operation of the feeder system, end sections of each feeding slat are endwise movable relative to the connectors securing the slats to the respective driving chains. The ability of the slat to move endwise reduces side-pull forces created when a slat impacts with an obstacle.

In a preferred form of the invention, each connector slidably captures an end section of the slat and imparts fore-and-aft movement thereto upon movement of the driving chains. In another embodiment of the invention, each connector includes a laterally extending bracket accommodating an attaching device which passes through a laterally elongated slot defined toward an end of the slat. With either embodiment, when the feeder slat impacts with an obstacle, and because the ends thereof are endwise movable relative to their connectors, the slat resiliently deflects until the obstacle clears the slat thereby minimizing damage to both the slat and the conveyor system.

The endless drive chains of the feeder assembly are driven in timed relation to each other and are entrained about first and second fore-and-aft spaced sprockets or drums which are mounted for rotation by the feeder housing. As is conventional, one drum is located at the feeder entrance adjacent a rotatable auger of the header assembly. The other drum is located adjacent the inlet end of the threshing apparatus. Each of the drums are movable in a fore-and-aft direction on the feeder housing.

As will be appreciated, the outwardly slanted profile on each feeder slat provides the conveyor system with an extended reach at a center portion thereof. Such a design improves the ability of the feeder slats to strip crop material from the auger of the header assembly and, thus, provide the feeder assembly with an aggressive feeding capability.

Although the slanted profile on the outer surface of the feeder slats provides an extended reach at a center section of the conveyor, as compared to the reach provided toward the opposite ends of each slat, such a configuration increases the swing clearance at the fore-and-aft end of the conveyor. Increasing the swing clearance at opposed ends of the conveyor system facilitates crop material flow toward the feeder entrance. Moreover, the slanted profile on the outer profile of the feeder slats reduces conveyor feedback problems at the inlet end to the threshing apparatus.

Numerous other features and advantages of the present invention will become readily apparent from the following detailed description, the accompanying drawings, and the appended claims.

BRIEF DESCRIPTION OF THE DRAWINGS

FIG. 1 is a fragmentary perspective view of a combine embodying the principles of the present invention;

FIG. 2 is a fragmentary horizontal sectional view of a forward end of a combine feeder assembly;

FIG. 3 is a fragmentary vertical sectional view of the combine feeder assembly;

FIG. 4 is a sectional view taken along line 4—4 of FIG. 3;

FIG. 5 is an enlarged fragmentary plan view of a feeder slat and its connection to driving chains of the combine feeder assembly;

FIG. 6 is an enlarged plan view of one embodiment of a feeder slat connector;

FIG. 7 is a side view of the feeder slat connector illustrated in FIG. 6;

FIG. 8 is an end view of the feeder slat connector with an end section of a feeder slat arranged in combination therewith;

FIG. 9 is an enlarged plan view of another feeder slat connector;

FIG. 10 is a side view of the feeder slat connector illustrated in FIG. 9;

FIG. 11 is an end view of the feeder slat connector illustrated in FIG. 9;

FIG. 12 is an enlarged plan view of a second embodiment of a feeder slat connector;

FIG. 13 is a side view of the feeder slat connector illustrated in FIG. 12;

FIG. 14 is an end view of an end section of a second embodiment of feeder slat; and FIG. 15 is a schematic end view of a third embodiment of feeder slat.

DETAILED DESCRIPTION OF THE INVENTION

While the present invention is susceptible of embodiment in various forms, there is shown in the drawings and will hereinafter be described presently-preferred embodiments of the invention, with the understanding that the present disclosure is to be considered as setting forth exemplifications of the invention which are not intended to limit the invention to the specific embodiments illustrated.

Referring now to the drawings, wherein like reference numerals indicate like parts throughout the several views, there is shown a self-propelled combine which is depicted only fragmentarily in FIG. 1 and is seen as represented in its entirety by reference numeral 10. Combine 10 includes a frame 12 with a body 14 supported on a pair of ground engaging front drive wheels 16 and a pair of steerable rear wheels (not shown). At its forward end, combine 10 includes a header assembly 18 and a feeder assembly 20.

In accordance with normal combine construction, the header assembly 18 includes a reel 22 which is rotatably mounted on a housing 24 to harvest crop material. As shown in FIG. 2, a consolidating auger 26 including flights 28 and 30 is also rotatably mounted by housing 24. The flights 28 and 30 operate to laterally move the harvested material toward the feeder assembly 20.

As shown in FIG. 3, the feeder assembly 20 is disposed and feeds crop material between the consolidating auger 26 of the header assembly and a threshing apparatus 32 arranged within the body 14 and supported on the frame of the combine. In the illustrated embodiment, the threshing apparatus 32 is of the axial flow type which embodies threshing and separating means in a single unit.

Generally, the threshing apparatus 32 includes a rotor assembly 34 mounted for rotation about an axis 36 and within a rotor casing 38. A frusto-conically shaped transition housing 40 is arranged at a forward end of the rotor casing 38 and defines a generally circular cross-sectional inlet 42 to the rotor assembly. A conventional impeller 44 is mounted for rotation within the transition housing 40 at a forward end of the rotor assembly 32. The impeller 42 includes a series of impeller blades 46 which extend outwardly from the rotational axis 36 to impart outward and rearward movement to the crop material received from the feeder assembly 20. High speed rotation of the rotor assembly 34 together with spiral vanes 48 on an inner surface of the transition housing 40 impel the crop material rearwardly in a general spiral direction about the rotor assembly 34.

As shown in FIG. 3, the feeder assembly 20 of the present invention includes a feeder housing 50 which envelopes and has mounted therewithin a conveyor 52. Both the housing 50 and conveyor 52 have salient features which facilitate crop material advancement toward the inlet end 42 of the threshing apparatus 32.

Turning to FIG. 4, the feeder housing 50 includes top and bottom walls 56 and 58, respectively, which are joined by side walls 60 and 62 to define an enclosure which envelopes the conveyor 52. For purposes to be described hereinafter, the bottom wall 58 of feeder housing 50 is profiled to define a generally concave feeding surface 64 extending between sidewalls 60 and 62 for substantially the entire length of the feeder housing. As seen in FIG. 2, the forward end of the feeder housing 50 combines with housing 24 of the header assembly 18 to define an inlet 66 to the feeder assembly 20.

In the illustrated embodiment, the conveyor 52 of the feeder assembly 20 includes a series of laterally spaced endless chains 68, 68' and 68" with a plurality of feeder slats 70 secured to and spanning the lateral distance between the chains. As will be discussed in detail hereinafter, opposite ends of the feeder slats 70 are secured to the chains 68 and 68" in a manner allowing endwise lateral displacement of the slats in response to impact forces being applied thereto as by obstacles and the like.

The chains 68, 68' and 68" primarily extend in a fore-and-aft direction and, as is conventional, are comprised of a series of interconnected chain links. As shown in FIG. 3, each chain is entrained about forward and rearward drive sprockets or drums 72 and 74, respectively, and, therefore corresponding fore-and-aft sections of the chains extend generally parallel to each other. Either of the drums 72, 74 is driven through conventional means (not shown) and is controlled by the combine operator.

To allow for feeder system adjustability and to facilitate aggressive feeding, it is known to adjust each drum 72, 74 in a fore-and-aft direction. As a result of such endwise adjustment, however, and as shown in FIG. 2, the chains 68, 68', and 68" can extend beyond the housing 24 of the header assembly. The improvements to the feeder assembly offered by the present invention, however, enhances its aggressive feeding capability while minimizing interference of the chains 68 and 68" with the crop material being moved by the consolidating auger 26 toward the inlet 66 to the feeder assembly.

As best illustrated in FIGS. 2 and 4, each slat 70 has a substantially flat or planar configuration with a slanted or generally convex outer profile 76 which provides an extended reach at a central portion or section of each slat. As shown in FIG. 4, the configuration of the outer slat profile 76 compliments the profile of the conveyor feeding surface 64 of the housing 50.

To promote continued operation of the feeder assembly, the feeder slats 70 are fabricated from resilient deformable material and are connected to the drive chains 68, 68" in a manner permitting endwise displacement of the slats in response to an obstacle or the like impacting against the slat. Preferably, the slats are fabricated from spring steel, but other materials may be used provided they have the required resiliently-deformable characteristics. Other materials from which slat may be fabricated include various other metals and metal alloys and various plastics chosen or formulated to provide the desired characteristics. As will be appreciated, the ability of the slat to deform as a result of shocks and forces placed thereon, coupled with its endwise movability promotes extended use of the slats during operation of the feeder system.

As shown in FIG. 5, in a preferred form of the invention, each end of a feeder slat 70 is entrapped by a connector 80 carried on the respective driving chain. The connector 80 inhibits fore-and-aft movement of the slat 70 relative to the chain while allowing for lateral or endwise movement thereof to reduce the side pull forces imparted to the chain upon deflection of the slat. Intermediate its ends, each feeder slat 70 is vertically supported by a support assembly 81 extending upwardly from and connected to chain 68'.

Because each of the connectors 80 are substantially similar, only one connector will be described in detail with the understanding that other connectors 80 are similarly constructed. As seen in FIGS. 6, 7, and 8, each connector 80 has a generally U-shaped configuration including a bight portion 82 and vertically spaced, laterally inwardly extending arm portions 84 and 86.

The bight portion 82 of each connector 80 acts to join together two consecutive chain links of a driving chain. Preferably, the bight portion 82 of each connection includes two spaced apertures or holes 88 and 90 which are sized and located to receive two consecutive chain pins 92 and 94 of a respective driving chain.

Arm portions 84 and 86 of each connector each define open-ended and laterally extended slots 96 and 98, respectively. Each slot 96, 98 has a width generally corresponding to the width of a feeder slat 70. As such, and as illustrated in FIG. 8, an end portion of each feeder slat 70 is accommodated and slidably entrapped by arms 84 and 86 of each connector.

Each support assembly 81 for vertically supports and connects a midsection of each slat relative to driving chain 68'. Since the support assemblies are substantially similar to each other, only one support assembly will be described in detail with the understanding that the other support assemblies are similarly constructed.

In the illustrated embodiment and as shown in FIGS. 9, 10, and 11, each support assembly 81 is comprised of two support pieces 100 and 102 which are mirror images of each other. Each support piece 100, 102 includes a link-attaching portion 104 and a slat attaching portion 106 connected to and projecting vertically upright from the link-attaching portion 104.

Each link attaching portion 104 of support pieces 100, 102 acts to join together two consecutive chain links of chain 68'. Preferably, each link attaching portion 104 includes two spaced holes or apertures 108 and 110 which are sized and located to receive two consecutive chain pins 112 and 114 in the driving chain 68'.

The slat attaching portion 106 of each support piece 100, 102 has a generally P-shaped configuration defining a fastener accommodating recess 116 and having an open-ended vertical slot 118 intermediate opposite sides of the respective support piece. The vertical slot 118 has a width generally corresponding to the width of a feeder slat 70.

The midsection of each slat 70 is provided with two spaced apertures or holes 120 and 122 which are located in a generally common horizontal plane. Suitable fastening pins or the like 124 and 126, pass through the slat attaching portions 106 of each support 100, 102 to vertically support and add horizontal stability to the slat 70 passing through slot 118.

A second embodiment of a connector 80 for attaching end portions of each slat 70 to a respective driving chain is illustrated in FIGS. 12 and 13. In the second embodiment, each connector has a generally T-shaped configuration including joined leg sections 130 and 132. One leg section 130 of the connector serves to join together two consecutive chain links of a driving chain. As shown, leg section 130 is provided with two spaced apertures or holes 134 and 136 adapted to receive two consecutive chain pins 138 and 140 of a respective driving chain. The other leg section or bracket 132 laterally extends inwardly from the respective driving chain and defines an aperture 142 passing therethrough.

Turning to FIG. 14, an end section of each feeder slat of the second embodiment is provided with a laterally elongated slot 144. Between its ends, the slot 144 is adapted to accommodate a fastening pin 146 or the like. The feeder slat attaching pin 146 passes through the aperture 142 and is secured to the leg section or bracket 132 of the feeder slat connector 80. By such construction, the feeder slat is caused to move in a fore-and-aft direction with the connector 80 in response to movement of the chains, but is permitted endwise movement in response to deflection thereof.

The outer slanted profile surface 76 of each slat can be furthermore configured to promote advancement of material toward the threshing apparatus. As illustrated in FIG. 15, the outer slanted profile surface 76 of each slat can include a series of serrations 150 extending substantially along the entire surface 76.

During operation of the feeder assembly 20, the outwardly slanted profile 76 on each feeder slat 70 provides the conveyor 52 with an extended reach at a center section thereof as compared to the reach provided at opposite lateral ends of the conveyor 52. The extended reach at the center section of the conveyor promotes the ability of the feeder slat 70 to strip crop material from the consolidating auger 26 of the header assembly 18 and, thus, provide the conveyor 52 with an aggressive feeding capability.

In addition to enhancing the feeding capability of the feed assembly, the outwardly slanted profile 76 on each slat 70 allows the center section of the conveyor 52 to be positioned proximate to the consolidating auger 26 while opposite end sections are somewhat more removed. Accordingly, the slanted profile in each feeder slat 70 advantageously increases the swing clearance on opposite sides of the conveyor 52. This increased swing clearance allows for a greater range of fore-and-aft movement of the front or forward drum 72 while minimizing the projection of the chains 68 and 68" past the inlet end 66 to the feeder housing 50 thereby improving crop material flow between the consolidating auger 26 and the feeder assembly 20.

Similarly, the slanted outward profile on each feeder slat 70 advantageously increases the swing clearance on opposite sides of the conveyor 52 at the discharge end of the feeder assembly 20. The increased clearance between the ends of the conveyor 52 and the impeller 42 reduces the opportunity for backfeed and enhances operation of the feeder assembly 20.

Moreover, the profiled configuration of the bottom wall 58 and conveying surface 64 of the conveyor housing 50 enhances the delivery of crop material to the rotor assembly. As will be appreciated, the concave configuration of the bottom wall 58 modifies the feeding zone and promotes crop delivery from the conveyor toward the periphery of the impeller blades 46. Delivering crop material toward the peripheral edge of the impeller blades 46 facilitates movement of the crop material circumferentially outward and rearwardly in the threshing apparatus 32.

It is not uncommon during combine operation to have stones, rocks, and other obstacles pass into the feeder assembly 20. As will be appreciated, such obstacles can impart significant impact forces against the feeder slats 70. Whatever sort of slat deformation occurs, even during the most strenuous application of impact loads, the connectors 80 carried at opposite ends of the feeder slats by the respective drive chains allow for endwise movement of the feeder slats 70 thereby substantially eliminating any side pull force on the driving chains. Once the obstacle clears, the feeder slat is permitted to return to its original configuration thereby minimizing damage to both the slat and the conveyor system. In those embodiments wherein the feeder slat is slidably entrapped by connectors at opposite ends of the slat, the support assemblies 81 carried by the third chain 68' serve to vertically support the feeder slat during operation of the feeder system.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A feeder assembly for a combine having an auger extending laterally across a forward end of the combine to advance crop material from opposite lateral sides toward a lateral center of the combine, said feeder assembly comprising:
   a fore-and-aft extending feeder housing supported at a forward end of said combine rearwardly of said auger;
   at least two laterally spaced driving chains driven in timed relation to each other and substantially enclosed by said feeder housing, each of said driving chains being entrained about and toward opposite lateral sides of fore-and-aft spaced rotary means; and
   a plurality of feeder slats connected to and driven by said chains to rearwardly feed crop material received from said auger through said feeder housing, each of said feeder slats having an outer bowed profile which provides an extended reach at a center of the feeder slats as compared to the reach provided toward opposite lateral ends of each slat so as to increase swing clearance on opposite lateral sides of the feeder assembly thereby enhancing crop material advancement by the auger past lateral ends of the slats toward the lateral center of the combine whereat the extended reach of the feeder slats positively promotes engagement and rearward movement of the material through the feeder housing.

2. The feeder assembly according to claim 1 wherein each feeder slat is fabricated from a resiliently deformable material.

3. A feeder assembly for a combine, comprising:
   at least two laterally spaced driving chains driven in timed relation to each other, each of said driving chains being entrained about and toward opposite lateral sides of fore-and-aft spaced rotary means;
   a plurality of feeder slats with each of said feeder slats having an outer bowed profile which provides an extended reach at a center of the feeder slats as compared to the reach provided toward opposite ends of each slat so as to increase swing clearance on opposite lateral sides of the feeder assembly; and
   a series of connectors carried on said chains for connecting said feeder slats thereto, said connectors being configured to reduce side bar pull off force caused by deflection of said feeder slats during impact loading.

4. The feeder assembly according to claim 1 wherein said feeder housing has a bottom wall configured with an outwardly bowed profile substantially similar to that profile on said feeder slats.

5. A feeder assembly for a combine, comprising:
   at least two driving chains having corresponding sections extending generally parallel to each other; and
   a plurality of feeder slats driven by said chains, each of said slats having an outer serrated profile providing an extended reach at a central section of the slat to enhance a working relationship of the feeder assembly with related combine devices thereby improving operation of the combine.

6. The feeder assembly according to claim 5 wherein said outer profile on said feeder slats has a generally convex configuration.

7. A feeder assembly for a combine, comprising:
   at least two driving chains having corresponding sections extending generally parallel to each other; and
   a plurality of feeder slats driven by said chains, each of said slats having an outer profile providing an extended reach at a central section of the slat to enhance a working relationship of the feeder assembly with related combine devices thereby improving operation of the combine, and wherein an end section of each feeder slat is endwise movable relative to its respective driving chain to reduce lateral pull off forces created in response to impact forces being applied against the feeder slat.

8. A feeder assembly for feeding crop material toward a rotatable impeller of an axial flow combine, said combine including a rotor assembly having a generally circular inlet and said impeller arranged toward a forward end thereof, said feeder assembly comprising:
   a conveyor including at least two laterally spaced driving chains and a plurality of feeder slats spanning the lateral distance between and connected to said chains; and
   a housing enveloping said conveyor, said housing having a bottom wall having a concave feeding surface extending substantially the entire length of said housing to facilitate the delivery of crop material from a center portion of said housing toward the periphery of the impeller.

9. A fore-and-aft extending feeder assembly for a combine, comprising:
   a plurality of fore-and-aft extending endless chains including two laterally spaced outside driving chains having corresponding sections extending generally parallel to each other;
   a plurality of feeder slats having a generally flat configuration driven by said driving chains, each of said feeder slats bridging the lateral space between said outside driving chains and a bowed outer edge defining an outer reach of each slat; and
   a plurality of slat connecting means carried by said driving chains for connecting opposite ends of each slat to the driving chains, each slat connecting means capturing an end section of and imparting fore-and-aft movement to a respective feeder slat upon movement of said driving chains, and wherein each slat connecting means allows for endwise movement of a respective feeder slat caused by slat deflection during impact loading.

10. A fore-and-aft feeder assembly for a combine comprising:
    two laterally spaced fore-and-aft extending endless driving chains having corresponding sections extending generally parallel to each other;
    a plurality of feeder slats, each slat bridging the lateral space between said outside driving chains;
    operative means carried by said driving chains for transferring movement of the chains to the slats, said operative means releasably capturing opposite end sections and allowing for endwise movement of respective feeder slats caused by slat deflection during impact loading; and
    a third chain interposed between said outside driving chains and a plurality of slat support means connected to and extending from said third chain for vertically supporting a center section of each feeder slat.

11. The fore-and-aft feeder assembly according to claim 10 wherein said operative means includes a series of laterally extending brackets connected to said driving chains, each laterally extending bracket accommodating an attaching device passing through a laterally elongated slot defined by and toward an end of each slat, said slot allowing for endwise movement of said slat caused by deflection thereof.

12. A feeder assembly for an axial flow combine including a mobile fore-and-aft extending frame, a header assembly connected to and extending laterally across said frame for cutting and harvesting crop material, said header assembly including an auger for advancing crop material toward a center portion thereof, said conveying system serving to rearwardly advance the crop material received from said auger to radially extending impeller blades arranged for rotation in a transition housing on the combine, said feeder assembly comprising:

first rotary means located at a feeder entrance and adjacent said auger of said header assembly;

second rotary means located adjacent an inlet end of said transition housing on the combine;

at least two laterally spaced endless driving chains driven in timed relation with each other, each of said chains being entrained about and toward opposite sides of said first and second rotary means; and a plurality of feeder slats connected to and driven by said chains, each of said feeder slats having an outer profile providing an extended reach at a center section of each slat as compared to a reduced reach provided toward opposite ends of each slat, and wherein the extended reach enhances auger stripping at the feeder entrance while the reduced reach provided toward the end sections of each slat increases swing clearance of the slats at the feeder entrance and reduces backfeed at an opposite end of the feeder assembly by propelling the material toward the periphery of said impeller blades.

13. The feeder assembly according to claim 12 wherein the outer profile of said slats has a generally convex configuration.

14. The feeder assembly according to claim 12 further including a feeder housing which envelopes said chains and slats and includes a bottom wall having a configuration which is complementary to the outer profile on said slats.

15. The feeder assembly according to claim 12 wherein each of said slats are connected to said chains by connectors which extend inwardly from a respective chain and slidably capture an end of the feeder slat to thereby permit endwise movement of a respective slat caused by resilient deflection of the slat during input loading.

16. A feeder assembly for a combine having an auger extending laterally across a forward end of the combine to advance crop material from opposite lateral sides toward a lateral center of the combine, said feeder assembly comprising:

a fore-and-aft extending feeder housing supported at a forward end of said combine rearwardly of said auger;

laterally spaced driving chains driven in timed relation to each other and substantially enclosed by said feeder housing, each of said driving chains being entrained about rotary means; and a plurality of feeder slats driven by said chains to rearwardly advance crop material received from said auger through said feeder housing, each of said feeder slats having an outer profile providing an extended reach at a center section of the slat as compared to the reach provided toward opposite ends of each slat to increase swing clearance at opposite lateral sides of the feeder assembly thereby enhancing crop material advancement by the auger past lateral ends of the slats and toward the lateral center of the combine whereat the extended reach of the slats promotes engagement and rearward advancement of the material through the feeder housing.

* * * * *